Feb. 28, 1961   J. I. YELLOTT ET AL   2,973,057
METHOD AND APPARATUS FOR FLY-ASH SEPARATION
IN COAL-BURNING GAS TURBINE
Filed Nov. 30, 1955   4 Sheets-Sheet 1
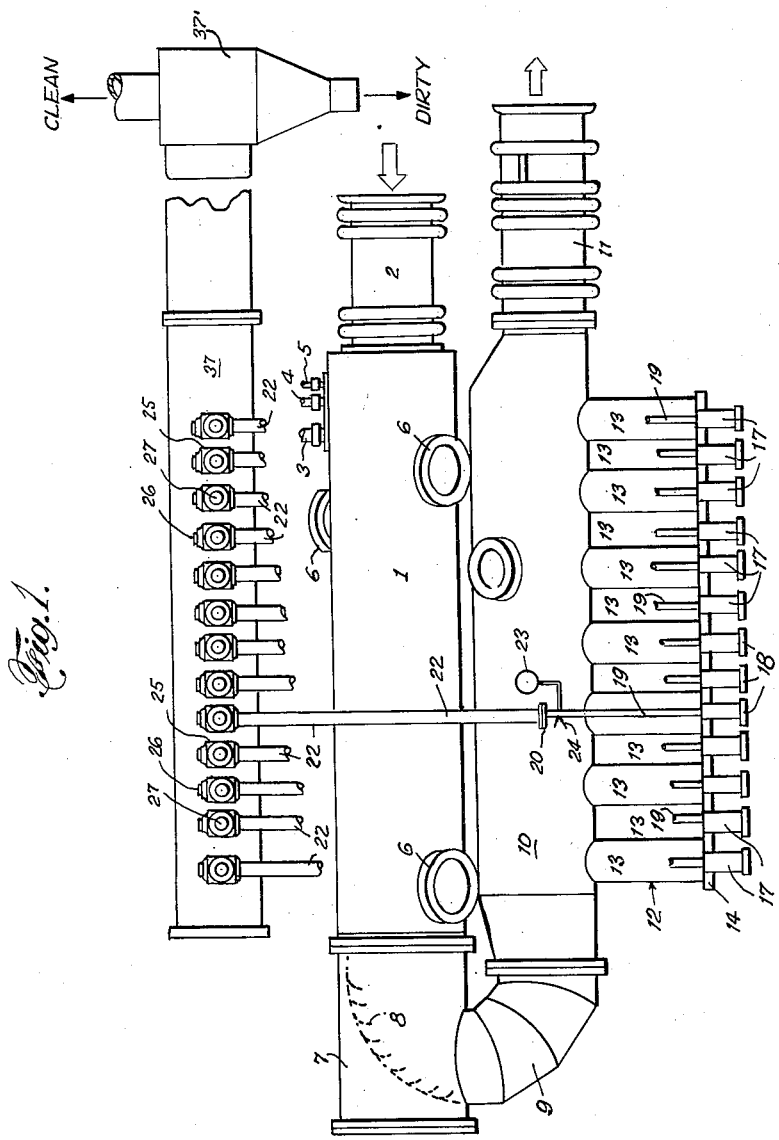
INVENTORS
JOHN I. YELLOTT
PETER R. BROADLEY
BY
ATTORNEYS

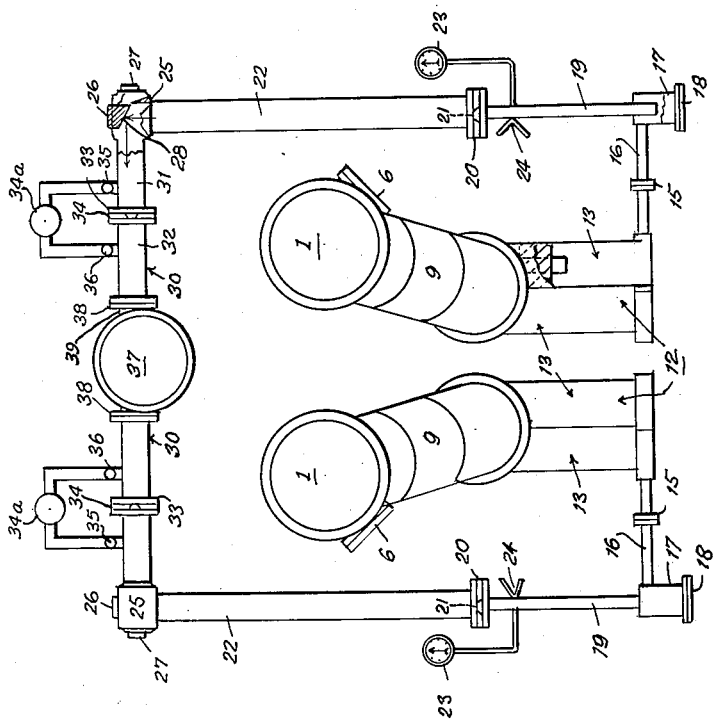

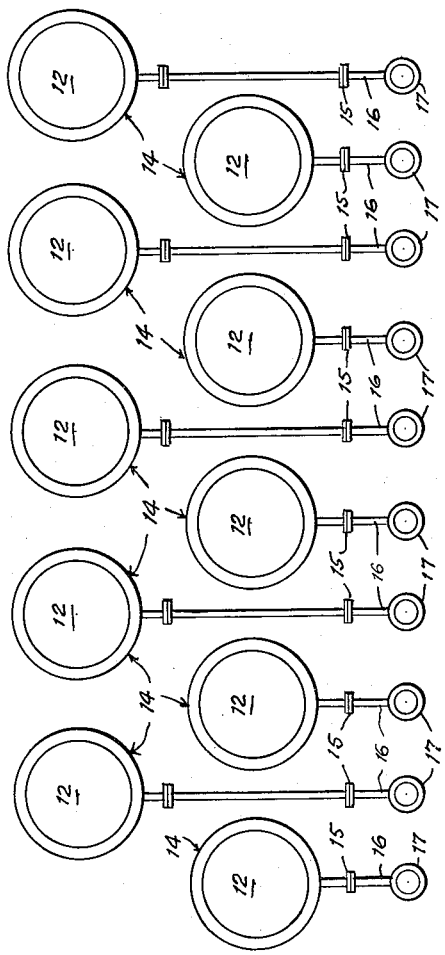

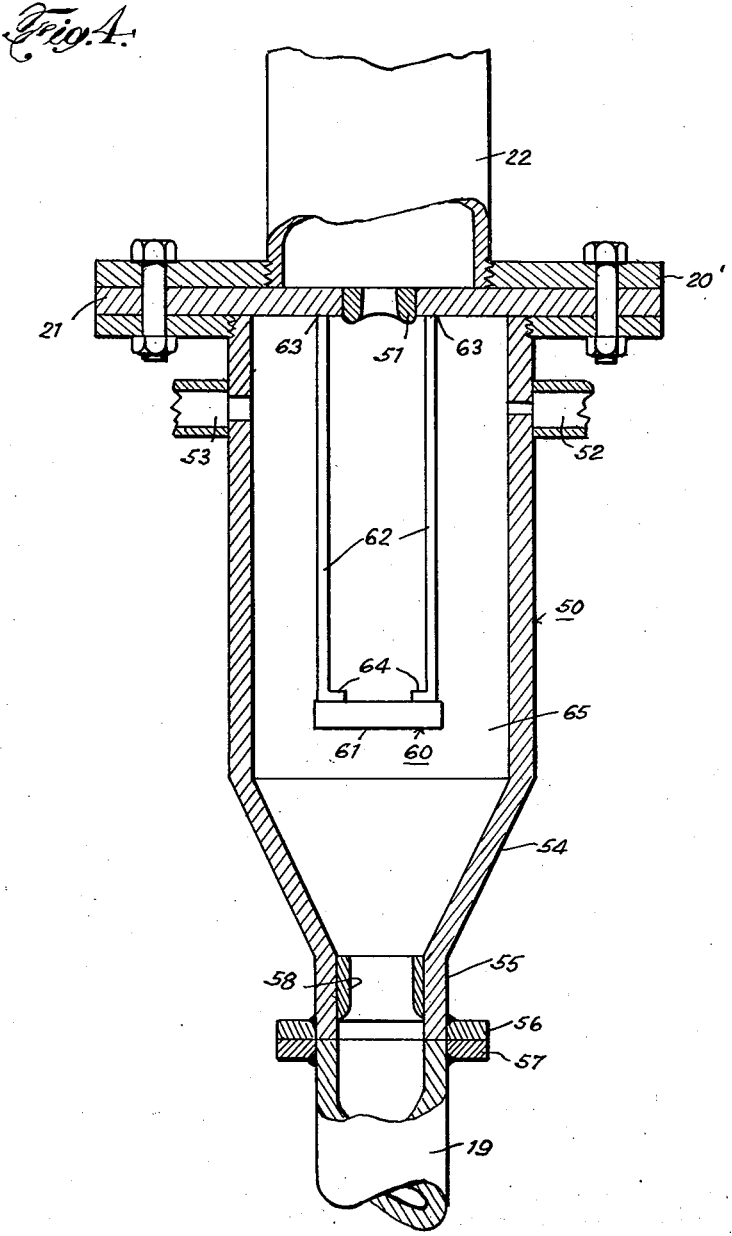

2,973,057
Patented Feb. 28, 1961

2,973,057
METHOD AND APPARATUS FOR FLY-ASH SEPARATION IN COAL-BURNING GAS TURBINE

John I. Yellott, New York, N.Y., and Peter R. Broadley, Elizabeth, N.J., assignors to Bituminous Coal Research, Inc., Washington, D.C., a corporation of Delaware Filed Nov. 30, 1955, Ser. No. 550,083

11 Claims. (Cl. 183—38)

This invention relates to novel method and apparatus for the separation of solids from pressurized entraining gas streams. More particularly, the invention relates to novel separation equipment for the discharge of solids in blowdown streams comprised of fractional amounts of the original pressurized gasiform fluid in which the solids were dispersed, the blowdown streams being reduced to substantially atmospheric pressure to effect complete separation of the solids from the gasiform carrier, and the separated solids and gasiform carrier are separately withdrawn from the system.

The pneumatic transport of powdered solids in pressurized gasiform carrier streams permits the handling of the solids as truly fluent materials flowable in pipes and other conduits as opposed to prior bulk handling methods. While pneumatic transportation improves efficiency of handling solids, the recovery of the solids from the entraining pressurized gasiform streams involves a number of problems. Where powdered solids are gas borne, as in fluidization processes involving reactions between the components of the fluidized system, the recovery and separation of solids from the gaseous carrier stream and contained gaseous product of reaction is fraught with many difficulties. A typical chemical reaction with which the invention herein is particularly concerned is the pressurized combustion of powdered coal in motive fluid generators of gas turbine power plants, and the separation of resulting ash and incompletely burned combustible particles, as described at some length in our pending application Serial No. 330,077, filed January 7, 1953, John I. Yellott and Peter R. Broadley, for Coal-Burning Gas Turbine Power Plant Incorporating Novel Self-Supporting Pressure-Sustaining Vortical Whirl Separators Together With Improved Ash Quenching and Blowdown Means, now Patent No. 2,911,065, issued November 3, 1959. Other pressurized chemical reactions carried out at high temperatures and in the gas phase, include catalytic cracking of hydrocarbons and other chemicals in the presence of fluidized powdered catalyst material; the hydro-forming reaction, in which hydrogen gas, under pressure, is used, alone, or in admixture with gasiform reagents, as the fluidizing or carrier gas for powdered chemical raw materials, or catalysts.

In all of the gas phase reactions indicated above, the fundamental problem is one of pneumatic transport of the powdered or pulverized solids as a gasiform fluidized stream through and out of a reaction zone, and the ultimate separation of the solid elements of the system from the pneumatic or gasiform entraining elements.

In our prior application above referred to, and other applications (Serial No. 330,076, filed January 7, 1953, John I. Yellott and Peter R. Broadley, for Coal Burning Generating Electric Locomotive With Improved Ash Separation and Storage System and Method of Operating Same, now Patent No. 2,857,854, issued October 28, 1959 and Serial No. 334,052, filed January 29, 1953, John I. Yellott and Frederick D. Buckley, for Coal Burning Generating Electric Locomotive With Improved Ash Handling System and Heat Recovery), now Patent No. 2,771,962, issued November 27, 1956, the separation of fluidized solids from pressurized, high temperature gas streams, is accomplished by passing the fluidized stream through reverse flow separators, usually of the vortical whirl type, and arranged in batteries comprised of a sufficient number of separators to handle the throughput. In these prior systems, the solids separated out in the separators are removed therefrom in blowdown streams comprised of minor fractions (.05-10%) of the volume of the carrier gas, while the cleaned gas is separately recovered. With the use of blowdown systems of the types disclosed in our said prior application, the major difficulty encountered with high pressure, high temperature operation, is the tendency of blowdown lines getting plugged up due to the attempted passage of oversized particles therethrough. These oversized masses or aggregates may be formed in situ by accretion of particles, as well as being comprised of masses blown through from the separator.

When a blowdown line of a tube in such a battery is plugged, that tube is discharged from the separator battery. To overcome this trouble, we have proposed the insertion of flow-measuring and control means, including calibrated flow restrictors in the blowdown lines to insure balancing of blowdown flow in the batteries. While the use of such devices in the blowdown system greatly improved the efficiency, it did not permit positive measurement of the flow in any given blowdown line.

We have now found that a critical flow nozzle, with the measurement of the upstream temperature and pressure, provides a positive means of regulating and measuring the flow. This, however, is subject to one major defect, since a pressure gauge will show the same reading if the nozzle is plugged completely or partially. We therefore provided a second means for determining whether the flow is coming from the full nozzle area. While this can be done by incorporating a flow metering device in the upstream, high pressure, high temperature region of the blowdown stream, we prefer to do it in the downstream, low pressure region, where it is easier to keep the pressure drop measuring means in good condition. Thus, while the critical flow nozzle alone is not an absolutely positive flow measuring device, the combination of the critical flow nozzle and the metering nozzle gives a completely reliable indication of the amount of gas flowing through the line. A critical problem to be met in the novel system herein is to prevent the plugging of the critical flow nozzle or restrictor. A second problem is the prevention of erosion by the high velocity jet from the critical flow nozzle.

Thus the crux of the invention may be stated as involving:

(1) A reverse flow separator with a blowdown line;

(2) A discharge pipe terminating in a critical flow restriction (a critical flow restriction is one in which the discharge pressure is approximately .53 times the initial pressure, and in which the discharge pressure variations do not affect the rate of flow, which is determined solely by the upstream pressure and temperature, and the area of the restriction);

(3) A metering nozzle, operating well down stream from the critical flow restriction, so that it works virtually at atmospheric pressure, but at almost the same temperature as the critical flow restrictor. By reducing the pressure at the location of the metering nozzle, it is much easier to keep the pressure taps operating properly.

The metering nozzle can be a restriction of any desired kind, and a special feature of the invention is that it can be calibrated in place, since it is quite possible to blow air through the discharge pipe with the critical pressure restrictor in place, and thus measure accurately the air going through the metering nozzle. This enables one to obtain a calibration for each individual nozzle. In practice it is found, for example, that nozzles made from exactly the same drawing, and installed in identical planned arrangements, have coefficients which can vary as much as 10%. The metering nozzle can be either a rounded nozzle or a sharp edged orifice. The orifice is preferred to some extent, because it is easier to duplicate them by making a number of them exactly the same. A segmental orifice also may be used.

As will appear more fully hereinafter, the critical flow restriction comprehended herein, may comprise a single critical flow nozzle or two nozzles in series. With a single critical flow nozzle it is desirable to install a miniature separator in advance thereof. With the use of two nozzles in series, the miniature separator can be eliminated. In the dual nozzle setup, the first nozzle is used to accelerate the particles in the blowdown stream and throw them against the axially aligned target prior to entering the second critical flow nozzle. The objective of this device is to utilize the energy of the jet to pulverize any lumps which might possibly be large enough to plug the critical flow nozzle.

The novel reverse flow separator system with blowdown separation and removal of separated solids will be seen to be adapted for use with a variety of gas phase chemical reactions normally carried out at high pressure and high temperature, as well as being used for the more conventional pneumatic conveying of powdered solids as fluidized streams. The separated, cleaned gas can be specially treated and replenished before being returned to the reaction system, and the separated solids, in the case of catalytic materials, after purifying treatments, can be returned to the reaction system. Thus, in catalytic cracking processes wherein carbonaceous deposits are formed on the surface of the catalyst particles, and the catalytic action of the particles is inhibited or reduced to an undesired degree, the carbonized mass can be subjected to treatment in an oxygenated gasiform carrier fluid at temperatures sufficiently high to insure a combustion and removal of the carbonaceous deposits, whereby the catalyst mass is restored to its original activity.

A preferred use of the invention herein, is, as already noted, in the separation of ash and incompletely burned fuel particles from motive fluid generators of gas turbine power plants, which generators use powdered coal. In such systems, it has been found that at pressures of four to five atmospheres and combustion temperatures of about 3000° F., but with very short residence time in the combustor, as much as 50% to 60% of the refuse will be unburned carbon. The refuse must be removed as completely as possible from the motive fluid before the latter can be introduced into a turbine. This can be most expeditiously done by the use of our novel blowdown systems as improved by the features of the present invention.

It is therefore a feature of novelty and advantage of the present invention to provide a novel solids recovery system for the separation of entrained particulate solids from the pressurized carrier gas stream.

It is another feature of novelty and advantage of the present invention to provide a novel system for the separation of entrained solids from pressurized gasiform fluids utilizing batteries of reverse flow separators incorporating blowdown lines for the removal of separated solids and embodying critical flow restrictor means, together with flow metering means to determine the function or non-functioning of a given blowdown line in a separator system.

Other features of novelty and advantage of the invention herein include the incorporation of solids separation and recovery steps in pressurized gas phase chemical reactions, generally where gasiform fluids are reacted on, in whole or in part, in the presence of, or with entrained powdered solids.

With these and other objects in view, which may be incident to our improvements, the invention consists in the parts and combinations to be hereinafter set forth and claimed, with the understanding that the several necessary elements, comprising our invention, may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings, like numerals refer to similar parts throughout the several views, of which:

Figure 1 is a side elevation of a pressurized motive fluid generator for gas turbines embodying the novel separation system herein;

Fig. 2 is an end elevation of the generator shown in Fig. 1;

Fig. 3 is a vertical section through one of the blowdown lines shown in Figs. 1 and 2, showing the combination of a critical flow nozzle and flow metering section, together with a preliminary solids reducer, and Fig. 4 is a detailed vertical section of a modified critical flow nozzle arrangement using two nozzles in series with an interposed target in axial alignment with the first of the nozzles.

Turning now to the drawings, and more particularly to Figs. 1 and 2, the invention herein will be shown in reference to its embodiment in a combustor-ash separator section of a gas turbine power plant. The system there disclosed comprises duplicate elements, which, for purposes of convenience, will be identified by common numerals as they are identical in function and structure, and, in the arrangement disclosed, are mounted as mirror images of each other in the assembly. Each such unit will comprise a combustor 1, having an expansible secondary air inlet 2, a fuel burner, not shown, and serviced by a pressurized air-borne coal supply line 3, together with auxiliary circulating oil lines 4, 5. The combustors may be provided with sight holes or windows 6. The downstream end 7 of the combustor 1 is provided with an internal curvilinear louvre 8, shown in dotted lines, for introducing coolant air into the products of combustion projected thereagainst. The curvilinear downcomer duct 9 is coupled to an ash separating casing 10 having a cleaned gas discharge 11 normally coupled to the gas turbine, not shown. The casing 10 is provided with an internal slope sheet, not shown, which divides the casing into a bottom dirty gas plenum chamber and an upper cleaned gas plenum chamber severally interconnected through a battery of vortical whirl separators generally designated by the numeral 12. This construction is more fully disclosed and claimed in our prior application Serial No. 330,077, filed January 7, 1953, now Patent No. 2,911,065, issued November 3, 1959, and the details of which will not be shown in the present case except where necessary for an understanding of the improved blowdown system herein.

As shown, each separator 13 comprises a cylindrical casing provided with a bottom blowdown section 14, of annular configuration, and incorporating a flanged blowdown nipple or outlet 15. In the particular forms shown in Figs. 1, 2, and 3, the blowdown line 16 is coupled to a flanged outlet 15 of the separator. The line 16 forms the first leg of the upstream pressure section and discharges tangentially into a dynamic strainer 17 having a flanged bottom 18, together with an axial discharge pipe 19. It will be seen that coarse or oversized particles discharged tangentially into member 17 through line 16 will be trapped and whirled around until they are reduced to a particle size small enough to be carried out through line 19. Any particles or aggregates which are not reduced and carried off by the streaming gases may be removed upon shutting down the unit, and unbolting and removing the cover 18. The leg or line 19 is tapped into a flanged coupling 20 in which is incorporated a critical flow nozzle 21. The downstream or atmospheric blowdown line section 22 is coupled to the member 20 in axial alignment with the line 19. A pressure gauge 23 and thermocouple 24 are severally coupled or tapped into the line 19 immediately below the critical flow nozzle. The pipe 22 is of appreciable length to prevent erosion by the discharge from the critical flow nozzle 21. A cross 25 is coupled to the top of pipe 22 and incorporates impact plug 26 and thermometer well plug 27. The plug 26 is detachable and is provided with an impact face 28 of tungsten carbide, or the like.

The discharge line 30 comprises a first section 31 tapped into member 25, and a second section 32, connected to the first section through flanged coupling 33 incorporating a metering nozzle 34. Pressure taps 35, 36, are severally connected or tapped into sections 31, 32 of line 30, upstream and downstream of nozzle 34, as shown. These taps are connected to any suitable flow measuring means, such as manometer 34a. Discharge line 30 is coupled to blowdown manifold 37 through flanged coupling 38 and stub pipe 39. It will be noted that apposed discharge lines 30 are diametrically embouched in manifold 37 so that the apposed discharges neutralize each other and abrasion or erosion of the manifold is avoided.

It will be seen that the upstream or pressure section of the blowdown line is provided with means 17 for the separation and removal of oversized particles which might otherwise tend to plug the critical flow nozzle. In a battery of separators such action can take place without any indication of which blowdown stream of the battery is involved. By the practice of the present invention any such action is immediately detected because of the positive flow-measuring means provided. Thus the pressure gauge 23 will give the same reading no matter whether the critical flow nozzle 21 is clear or plugged. However, with metering nozzle 34 and manometer 34a situated well downstream from the critical flow nozzle, any cessation of flow due to plugging of nozzle 21 will be immediately detectable. By the simple expedient of mounting the metering nozzle at the discharge end of the blowdown line, operating at substantially atmospheric pressure, the blowdown stream is relatively cool, because of the expansion through the critical flow nozzle, and the deleterious action of the super-heated blowdown gases on the manometer taps, which is met with when the taps are connected directly across the high temperature (1300° F.) discharge of the annular blowdown chamber 14, is avoided. There is no destructive action in the atmospheric discharge side of the system. The ash-containing blowdown stream, delivered into the manifold 37, is at relatively low temperature and atmospheric pressure, and can be discharged directly into a secondary ash separator 37', the cleaned gas or blowdown gas and separated solids being separately treated, if desired, and returned to the separation system or to the chemical reaction steps, where chemical reactions are involved.

In the form shown in Fig. 4, the upstream or pressure leg of the blowdown system is modified to eliminate the dynamic strainer 17, and substitute therefor the cylindrical chamber 50 coupled at its upper end to flanged coupling 20', which incorporates a critical flow nozzle 51. Cylinder 50 may incorporate the usual pressure tap 52 and temperature tap 53. Member 50 is provided with a truncated conical bottom 54, terminating in a cylindrical stub section 55 secured to flange 56 which is hermetically attached to coaxial flange 57 secured to the upper end of pressure leg 19. The cylindrical stub section 55 mounts a first or impact nozzle 58 having a diameter at least twice as great as that of the upper nozzle 51. A target 60 is provided with an impact face 61 of any suitable abrasion resistant material, such as tungsten carbide, and is suspended in the chamber formed by member 50, in axial alignment with the nozzles 58 and 51. The target is suspended by supporting rods 62 of which there are at least two, the rods being severally secured to member 21 as indicated at 63, and to member 61 as indicated at 64.

With this latter type of construction, the high velocity stream discharged through relatively large impact nozzle 58 is rectangularly projected against the impact face 61 of target 60, and any oversized particles are shattered and carried out of the chamber through the smaller critical flow nozzle 51. Thus in a system in which pipe 19 has an internal diameter of .82", the cylinder 50 will be 2" in diameter, while the nozzle 58 will have ½" aperture, and the nozzle 51 will have a ¼" aperture. With this arrangement the target 60 normally will have a diameter of 1", defining an annulus 65 between it and member 50, which annulus will have a gap width of ½". The flow of material will be unimpeded into the upper portion of member 50, which, because of the critical flow nozzle 51, will be maintained at substantially the upstream or blowdown line pressure obtaining at the separator outlet.

While we have shown and described preferred embodiments of our invention, we wish it to be understood that we do not confine ourselves to the precise details of construction or mode of operation therein set forth by way of illustration, as it is apparent that many changes and variations may be made therein, by those skilled in the art, without departing from the spirit of the invention or exceeding the scope of the appended claims.

What is claimed:

1. An improved flow-measuring system for the blowdown lines of reverse flow vortical whirl separators of separator batteries, comprising, in combination, a blowdown line coupled to each separator, a discharge line for each separator coupled to the downstream end of a blowdown line and to a common blowdown manifold, each said blowdown line comprising an upstream section coupled to a downstream section through a critical flow nozzle; an angular connection for each blowdown line and its co-operating discharge line, each said connection incorporating an impact plug in axial alignment with the blowdown line; flow-measuring means in each said discharge line, and pressure and temperature measuring means in the blowdown line upstream of the critical flow nozzle.

2. Flow-measuring system according to claim 1, characterized by the fact that each flow measuring means comprises a manometer coupled to a discharge line through spaced taps in the line, and a flow-measuring restrictor is disposed in the line between the taps.

3. Flow-measuring system according to claim 1, characterized by the fact that the upstream section of the blowdown line is right angled, and the diameter of the downstream section is greater than that of the said upstream section.

4. Flow-measuring system according to claim 1, characterized by the fact that the elements of the blowdown lines are detachably intercoupled.

5. In a pressurized vortical whirl, reverse flow separator battery, for the removal of entrained solids from pressurized gasiform fluids, and incorporating blowdown lines from each separator for the pneumatic removal of separated solids in blowdown streams of the entraining gas, and wherein the separators are aligned in groups, whereby the flow through the initial separators of a group is normally disproportionately greater than the flow through the succeeding separators of the same group, the improvement comprising a blowdown system consisting of an array of efferent blowdown lines hermetically coupled to reverse flow separators, each said blowdown line being bipartite and formed of a pressurized upstream section coupled to a downstream extension of greater diameter through a critical flow nozzle, whereby the pressure of the carrier stream is reduced to atmospheric and its velocity is increased, the said carrier stream discharging into a take-off pipe through an angle coupling, and the take-off pipes jointly discharging into a common blowdown manifold, and means for determining the flow characteristics of each said blowdown line, comprising a pressure gauge and a thermometer tapped into the upstream section of the blowdown line, in advance of the critical flow nozzle, and flow measuring means in the take-off pipes comprised of flow restrictors and manometers connected across the flow restrictors.

6. Separator battery according to claim 5, characterized by the fact that the pressurized upstream section of each blowdown line embodies a reverse flow vortical whirl dynamic strainer of limited capacity with the cleaned gas discharge tube coupled to the critical flow nozzle, the said limited capacity strainer having a detachable drop-out bottom.

7. Separator battery according to claim 6, characterized by the fact that the dynamic strainers in the blowdown lines are of approximately the same diameter as the upper sections of the blowdown lines.

8. In a blowdown system for the removal of separated solids from the individual reverse flow vortical whirl separators of separator batteries of pressurized powdered coal-burning motive fluid generators, the improvement comprising an individual separated solids blowdown line for each separator, each said blowdown line comprising an upstream pressure section and a downstream atmospheric section intercoupled through a critical flow nozzle, the sections severally forming mutually inverted L's with parallel input and discharge legs coupled by a uniaxial compound leg riser section embodying the output leg of the first L, and the input leg of the second L, a cyclone-separator type dynamic strainer in the elbow of the first L, flowing-measuring means in the discharge line, and a common discharge manifold into which the discharge lines are conjointly embouched.

9. Blowdown system according to claim 8, characterized by the fact that the blowdown lines are wholly externally disposed with respect to the motive fluid generators, and the segments of the lines are detachably intercoupled.

10. Blowdown system according to claim 9, characterized by the fact that with duplex motive fluid generators, the discharge legs of the blowdown lines of one separator battery are rectilinearly apposed in the common discharge manifold to their corresponding members of the other separator battery.

11. The improved method of separating particulate solids from pressurized gasiform fluids comprising the following steps: establishing a first pressure stage wherein a stream of solids-bearing pressurized gasiform fluid is continuously vortically whirled and the solids are centrifugally separated from the entraining fluid; separately withdrawing the cleaned gas and the separated solids, the solids being withdrawn in a pressurized blowdown stream of the gasiform fluid; passing the blowdown stream through a first blowdown line and at the original pressure; establishing a second, reduced pressure stage of increased diameter coupled to the first said blowdown line through a critical flow reducer which will result in the second reduced pressure approximating .53 times the original pressure, said second stage incorporating a rectilinear flow path of sufficient length to insure dissipation of the velocity resulting from the critical flow expansion, said flow path terminating in a bend embodying an impact surface in the axis of the flow path; establishing a third, discharge stage coupled to the bend and incorporating flow measuring means; discharging the reduced pressure blowdown stream and its entrained solids to an atmospheric vortical whirl separation stage, and separately withdrawing the cleaned gas and solids.

References Cited in the file of this patent
UNITED STATES PATENTS

| | | |
|---|---|---|
| 2,687,645 | Velten et al. | Aug. 31, 1954 |
| 2,717,658 | Bethea et al. | Sept. 13, 1955 |
| 2,771,962 | Yellott et al. | Nov. 27, 1956 |